(12) United States Patent
Johnson et al.

(10) Patent No.: US 12,296,566 B2
(45) Date of Patent: May 13, 2025

(54) DOUBLE-WALLED INSULATION FABRICS

(71) Applicant: Columbia Sportswear North America, Inc., Portand, OR (US)

(72) Inventors: Rebecca Lynn Johnson, Portland, OR (US); Joseph P. Boyle, Portland, OR (US); Debra Criss, Portland, OR (US)

(73) Assignee: Columbia Sportswear North America, Inc., Portland, OR (US)

( * ) Notice: Subject to any disclaimer, the term of this patent is extended or adjusted under 35 U.S.C. 154(b) by 232 days.

(21) Appl. No.: 17/392,079

(22) Filed: Aug. 2, 2021

(65) Prior Publication Data

US 2022/0030993 A1    Feb. 3, 2022

Related U.S. Application Data

(60) Provisional application No. 63/060,123, filed on Aug. 2, 2020.

(51) Int. Cl.
| | | |
|---|---|---|
| *B32B 3/12* | (2006.01) | |
| *A41D 31/06* | (2019.01) | |
| *A41D 31/102* | (2019.01) | |
| *B32B 5/06* | (2006.01) | |

(52) U.S. Cl.
CPC .............. *B32B 3/12* (2013.01); *A41D 31/065* (2019.02); *A41D 31/102* (2019.02); *B32B 5/073* (2021.05); *B32B 2305/30* (2013.01); *B32B 2307/304* (2013.01); *B32B 2437/00* (2013.01)

(58) Field of Classification Search
None
See application file for complete search history.

(56) References Cited

U.S. PATENT DOCUMENTS

| | | | |
|---|---|---|---|
| 4,716,598 A | 1/1988 | Bertram | |
| 2004/0253891 A1 | 12/2004 | Schierebeck et al. | |
| 2007/0245448 A1* | 10/2007 | Bury ........................ | A41D 3/00 2/108 |
| 2012/0260396 A1* | 10/2012 | Mordecai ............... | A41D 31/06 2/97 |

(Continued)

FOREIGN PATENT DOCUMENTS

| | | |
|---|---|---|
| EP | 3155916 | 4/2017 |
| EP | 3597062 A1 | 1/2020 |

(Continued)

OTHER PUBLICATIONS

Inoue, K., Winter Garment, Jul. 31, 2014, machine translation of JP2014-139352 (Year: 2014).*

(Continued)

*Primary Examiner* — Chinessa T. Golden
(74) *Attorney, Agent, or Firm* — Schwabe, Williamson & Wyatt, P.C.

(57) ABSTRACT

Embodiments herein provide a thermally insulated garment having a shell, a lining that is secured to the shell at a plurality of points to form a plurality of compartments, a thermally insulating filling contained within each of the plurality of compartments, and an outer layer disposed adjacent to the shell, wherein the outer layer overlays the plurality of points and the plurality of compartments while being detached from the plurality of points and the plurality of compartments.

15 Claims, 4 Drawing Sheets

(56) References Cited

U.S. PATENT DOCUMENTS

| | | | | |
|---|---|---|---|---|
| 2013/0177731 | A1* | 7/2013 | Moriarty | A41D 31/145 |
| | | | | 5/413 R |
| 2015/0104604 | A1* | 4/2015 | Rock | B32B 5/26 |
| | | | | 5/413 R |
| 2016/0213078 | A1* | 7/2016 | Bibeau | B32B 5/024 |
| 2016/0374408 | A1 | 12/2016 | Seo | |

FOREIGN PATENT DOCUMENTS

| | | | |
|---|---|---|---|
| JP | 2014-139352 | | 7/2014 |
| JP | 2014139352 A | * | 7/2014 |
| KR | 200455836 | | 9/2011 |

OTHER PUBLICATIONS

European Patent Office, Extended European Search Report issued in EP21852392.6, dated Jan. 5, 2024, 8 pages.

* cited by examiner

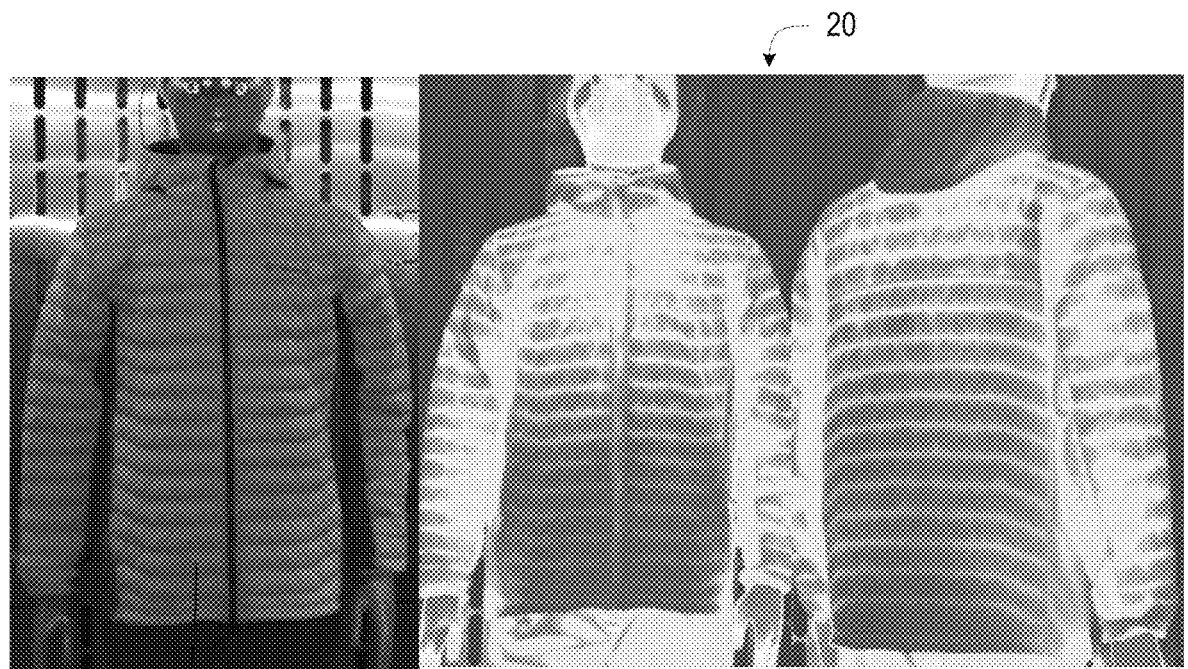
FIG. 1 – PRIOR ART
FIG. 2 – PRIOR ART

DOUBLE-WALLED INSULATION FABRICS

CROSS-REFERENCE TO RELATED APPLICATIONS

This application claims priority to U.S. Provisional Application No. 63/060,123, filed on Aug. 2, 2020, the contents of which are incorporated by this reference as if fully stated herein.

TECHNICAL FIELD

Disclosed embodiments are directed to insulation materials. Specifically, multiple insulation layers for garments, such as jackets, are disclosed.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Jackets and similar outerwear protect the wearer from cold temperatures that could pose a risk of hypothermia by use of one or more layers of insulating material. The material typically includes some form of bulky fibrous material that serves to trap air, which is heated by the wearer and so insulates from further heat loss. This material is usually placed between two or more layers that are configured to hold the material in place around the wearer. In some known jackets, at least one of these layers is typically substantially impermeable to moving air, to prevent wind from reaching the wearer and carrying away the heat entrapped by the insulating material. One or more of the layers, typically external from the wearer and insulating material, may further be waterproof or water resistant, depending on whether the outerwear is designed for use in damp, rainy, or snowy conditions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 is a photo of an example prior art jacket and associated thermal scan of the jacket, illustrating greater heat loss through stitching lines than is lost through insulating material.

FIG. 2 is a photo of an example jacket that lacks stitching lines, and associated thermal scan of the jacket, illustrating a substantially even retention of heat.

DETAILED DESCRIPTION

Figure 3:
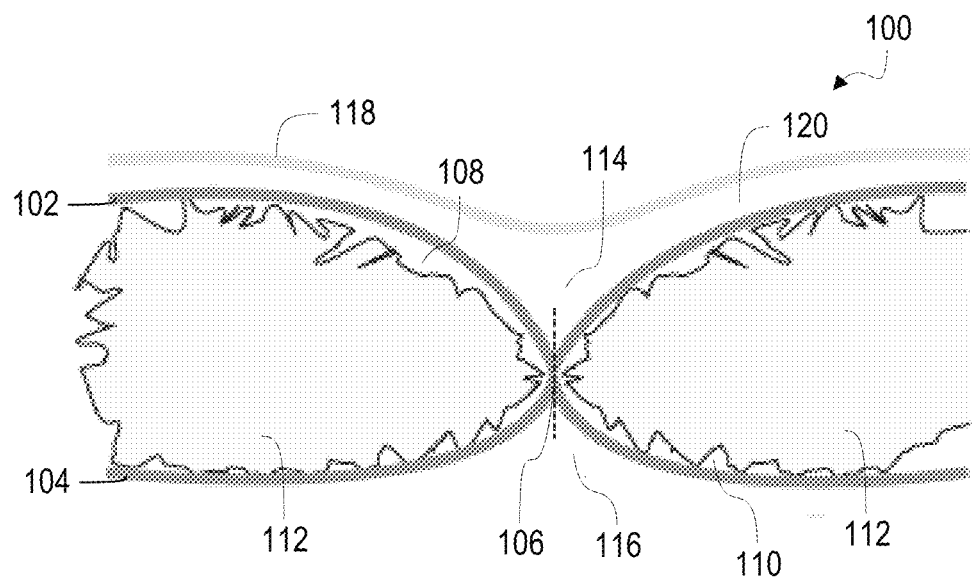
FIG. 3 is a cross-sectional view of a first example insulation fabric that includes a quilted layer and an outer layer that overlays the quilted layer, according to various embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Insulation effectiveness, for a given insulating material, is dependent on the thickness of the insulating material. Generally speaking, the thicker the material, the greater the insulating ability. Insulation works by trapping air, which exhibits a relatively low thermal conductivity, and preventing its movement. The trapped air closest to a wearer is heated, typically by the person's body heat, and a temperature gradient is created within the insulation layer. As heat transfers relatively poorly through stationary air, the wearer remains warm. Thicker layers of insulation offer greater resistance to heat transfer in cold ambient environments by creating a larger space of trapped air between the wearer and ambient air. The insulating material is typically trapped between two layers of material, such as an outer shell and inner liner. The shell and liner typically do not offer any substantial insulation, but instead may be wind and water resistant, to prevent convective loss of heat from the insulation via air movement, and to prevent the wearer and insulation from getting wet. Wet insulation can rapidly lose its insulating properties, due both to the greater thermal conductivity of water and the compaction of the insulating material by the presence of water. The presence of water displaces air within the insulating material, thus diminishing its effectiveness, and also typically results in the insulating material losing its bulk or loft, further diminishing its effectiveness.

However, thicker layers of insulation can become unwieldly and impractical to wear, in particular for active pursuits. It is thus desirable to utilize insulation fabrics that provide a high degree of insulation while minimizing thickness. Furthermore, relatively thick insulation layers within a coat can become unevenly compacted with use and over time, due to variations in fiber orientation, insulation movement, fit pressure, gravity, and/or wearer movements. As the insulation layer(s) become unevenly compacted, the degree of insulation they provide likewise becomes uneven, with thinner spots transferring more heat away from the wearer than thicker spots. For example, across the substantially vertical front, sides, and back of a coat or jacket, the insulation may thin at its top and increase near the jacket's hem, possibly due to the effects of gravity and user movement causing insulation to shift down towards the jacket's hem. Thus, the insulating properties of the jacket are reduced at the jacket's top, around a user's chest and shoulders, where it is typically more critical.

To prevent this movement, known jackets may employ quilting. This creates pouches or compartments, into which the insulation is inserted, that are interspaced between lines or points where the shell is attached to the liner. The quilting helps keep the insulation in place to minimize shifting and prevent unequal thickness across a jacket, allowing the insulating properties to be retained relatively consistently around the jacket. However, quilting inherently creates unevenness across the jacket from the valleys formed by the stitch or bonding lines and/or points where the shell is attached to the liner.

FIG. 1 illustrates these valleys 10, and in the thermograph 20, how the valleys 10 leak heat at a greater rate than the central portions of the insulated pouches bordered by the valleys 10. The valleys 10 can be seen as a lighter shade, indicating greater heat loss. At each valley 10, the shell and liner are in close proximity or, in some embodiments, contact each other. Each valley 10 is significantly thinner in cross section compared to each pouch containing insulation. Where the valleys 10 sandwich the insulation (such as where the insulation is placed between the shell and liner as a continuous layer), the insulation is compressed by the attachment between the shell and liner, such as by a row of stitches. The compressed insulation, lacking the loft and trapped air of uncompressed insulation, does not offer the same insulating properties as the uncompressed insulation in the pouches. Depending upon how the shell and the liner are attached, the attachment points may also directly bleed warmed air through stitch holes (such as where the attachment is via sewing) or other apertures. In other embodiments, insulation is only present in the pouches, and entirely absent along the valleys.

In any of the above arrangements, consequently, each valley 10 presents an area where heat can leak at a greater rate compared to each pouch defined by the valleys 10. Furthermore, if wind travels around the jacket parallel to the orientation of the valleys 10, heat loss can be exacerbated due to the wind easily stripping heated air away from the valleys. While FIG. 1 illustrates the valleys 10 as horizontally extending features, other jackets may employ different quilting patterns where valleys 10 may extend vertically, may form a grid pattern (i.e. the valleys 10 extend both vertically or horizontally to form roughly square or rectangular pouches), may form a diamond pattern (i.e. the valleys 10 extend at angles), may be discontinuous points or spots (i.e. the valleys 10 are formed into dimples), or another fanciful design or pattern. In all cases, each valley 10 presents an undesirable heat loss point for the same foregoing reasons.

The heat loss caused by the presence of valleys is illustrated in comparison with a jacket that lacks the valleys. A flat design, as seen in FIG. 2, results in an even loss of heat, seen in thermograph 30. However, a flat design presents the various disadvantages mentioned above, namely, potentially awkward maneuverability when thick insulation is utilized and/or a risk that the insulation material will shift within the jacket over time, diminishing the effectiveness of the jacket.

Disclosed embodiments address these shortcomings by placing at least one continuous outer layer over the shell that is not attached to the valleys. The outer layer thus serves two functions. First, by trapping air around the valleys, the trapped air may act as an additional insulation layer, slowing the heat loss through the valleys similar to the insulating material. Second, when implemented using a wind-resistant material, convective heat loss owing to wind movement along the valleys is reduced, if not eliminated. As a result, the advantages of a quilted design, namely easier maneuverability and maintenance of the insulation in an even layer, can be achieved without the disadvantages detailed above. Furthermore, the additional outer layer, by trapping air, helps improve the insulation effectiveness, allowing a jacket or garment with a thinner, less bulky insulation to achieve the same level of warmth and comfort as a jacket with a thicker insulation layer that lacks the additional outer layer. In other embodiments, an additional inner layer, adjacent to the liner but also not attached to the valleys, may be included, further enhancing the insulating properties of the insulation fabric.

While the description above notes that the outer and/or inner layer are not attached to the valleys, in embodiments, the outer and/or inner layer are also not attached to one or more of the pouches. Instead, the outer and/or inner layer may loosely overlay the pouches and valleys over at least a portion of the garment. In such a configuration, the outer and/or inner layer may be coupled to the garment at a boundary of a garment, such as at an edge, hem, existing seam, or the zipper, or may be a coupled at another location along the garment to partially secure the outer and/or inner layer.

Turning to FIG. 3, a first example embodiment is depicted in cross section. Insulation fabric 100 includes a shell 102 and a liner 104. Typically, shell 102 is oriented as the outer layer, facing ambient air, and liner 104 is oriented as the inner layer, facing the wearer. Shell 102 and liner 104 may be of similar materials, or different types. In some embodiments, shell 102 is waterproof and/or non-permeable to gasses. In some embodiments, liner 104 may be at least partially permeable to gasses, to enhance breathability for the wearer. Liner 104 may be constructed from felt or fleece or be felt or fleece lined, or lined with or manufactured from another suitable material, for wearer comfort.

The shell 102 and liner 104 are attached at point 106, to form a plurality of compartments or pouches 108 and 110. Each pouch 108 and 110 is filled with an insulation material 112. Shell 102 and liner 104 may be attached at point 106 using adhesives, welding, stitching, sewing, or any other suitable attachment technique. In the depicted embodiment, insulation material 112 is confined to each pouch 108 and 110. In other embodiments, the insulation material 112 may extend through point 106, where it is compressed through point 106. Point 106 results in the formation of a valley 114, on the side of shell 102, and a second valley 116, on the side of liner 104. Insulation material 112 may be a natural insulating material such as feathers, down, or loose cotton fibers, or a synthetic material such as fiberfill, or batting, or another suitable insulating material.

Over shell 102 is disposed an outer layer 118, which is not attached to shell 102 at point 106. As a result, outer layer 118 forms an air layer 120 between outer layer 118 and shell 102. In various embodiments, air layer 120 helps enhance the insulation properties of insulation fabric 100. Outer layer 118 may be made of a wind-resistant material, to prevent air currents from convectively removing heat from valley 114. Outer layer 118 may further be waterproof or water resistant. Outer layer 118 may be constructed from a synthetic or natural material or fabric. Outer layer 118 may be gas permeable, or semi- or partially-gas permeable, to allow the jacket to breathe and potentially vent moisture while nevertheless retaining heat. Absent outer layer 118, valleys 114 and 116, as discussed above, may act as points for potential heat loss and/or water ingress. In still other embodiments, outer layer 118 may be constructed from low emissivity materials, e.g. materials designed to minimize radiative loss or heat loss, or otherwise provide low emissivity to minimize heat loss.

Figure 4:
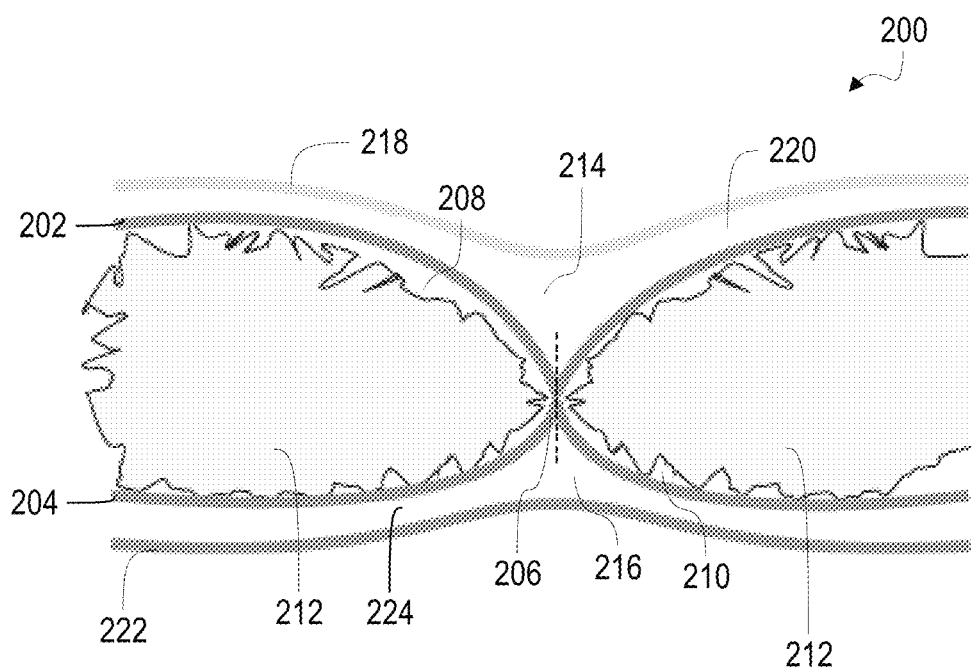
FIG. 4 is a cross-sectional view of a second example insulation fabric that includes a quilted layer, an outer layer that overlays the quilted layer, and an inner layer that overlays the quilted layer, according to various embodiments.

FIG. 4 depicts a second example embodiment in cross section. Insulating fabric 200 includes similar components to insulating fabric 100. To the extent not discussed below, the components of insulating fabric 200 may be of similar function and construction to the components of insulating fabric 100. Insulating fabric 200 includes a shell 202 and liner 204, which attach at point 206 to form pouches 208 and 210. Pouches 208 and 210 are filled with an insulation material 212. Point 206 forms a valley 214 adjacent to shell 202, and a valley 216 adjacent to liner 204. As with insulating fabric 100, shell 202 faces ambient air, away from the wearer, while liner 204 faces the wearer.

As with insulating fabric 100, insulating fabric 200 includes an outer layer 218, which overlays shell 202 but does not attach at point 206. Outer layer 218 forms air layer 220 with shell 202. Insulating fabric 200 further includes an inner layer 222, which overlays liner 204 but does not attach at point 206. Inner layer 222 forms a second air layer 224 with liner 204. Inner layer 222 may be formed of a similar material as outer layer 218, or a different material. In some embodiments, inner layer 222 may be fleece or felt lined for wearer comfort. The formation of second air layer 224, in embodiments, further enhances the insulating properties of insulating fabric 200.

In some embodiments, heat-managing elements (not shown) may be placed on one or more of the layers to further increase the heat retention attributes of the insulating fabrics 100 and 200. These heat-managing elements may be heat reflecting, heat absorbing, a combination of absorbing or reflecting, and/or of another suitable heat modifying nature. The heat-managing elements may be comprised of a metallic or a similarly suitable reflective material, and may form part of the shell 102, 202, or another layer. The heat-managing elements may be comprised of a metallic or a similarly suitable heat-reflective or low-emissivity material; multilayered structures with metallic, ceramic, polymeric or fabric layers; pods of vertically oriented fibers; closed-cell foam pods; and may form part of the shell 102, 202, or another layer.

In some embodiments, the quilted inner layer formed from shell 102, 202, insulation material 112, 212, and liner 104, 204, may be prepared from stitched or bonded constructions. In some embodiments, the quilted inner layer may be replaced by other heat-trapping constructions, such as fleeces, foam-printed fabrics, flocked fabrics, open-cell foams, etc. In some embodiments, the outer layer 118, 218 may be translucent to transparent so that construction or decorative features of the inner layers may be visible. In some embodiments, the inner layer 222 (for insulating fabric 200) may be patterned by the stitch/bond lines, or by prints, and be visible through a transparent to translucent outer wall. Suitable materials for layers 118, 218, or 222 include fabrics made from synthetic or natural fibers, including nylon, polyester, acrylic, rayon, cotton, blends of these fibers, coated fabrics of these fibers or their blends, or laminated fabric of these fibers or their blends. Outer layer 218 and/or inner layer 222 may be gas permeable, or semi- or partially-gas permeable, to allow the jacket to breathe and potentially vent moisture while nevertheless retaining heat.

Figure 5:
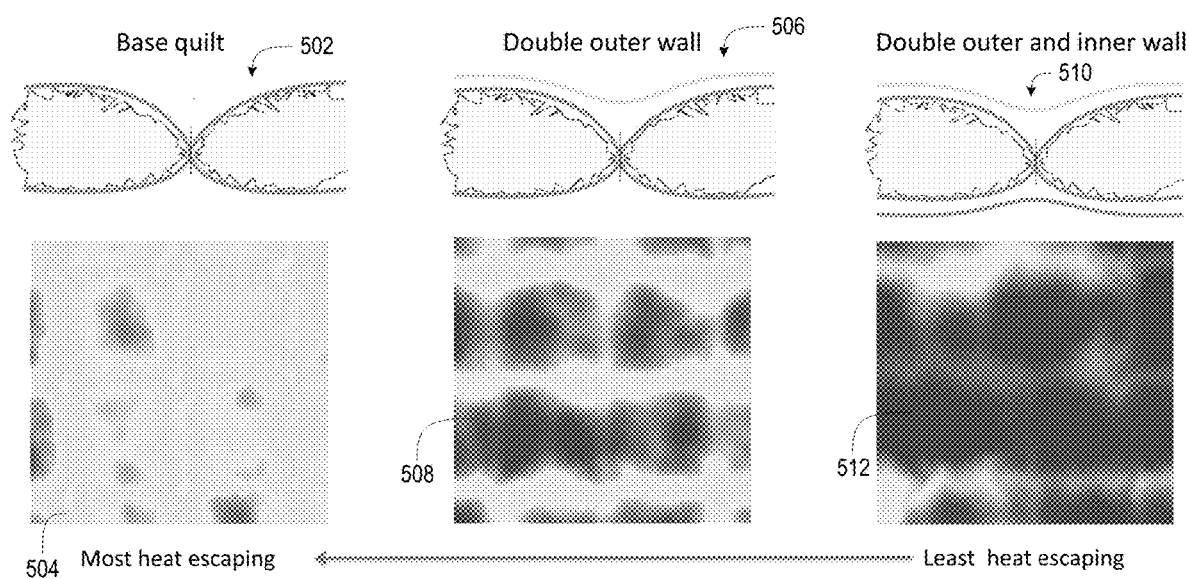
FIG. 5 is a chart depicting the quilted layer alone, the example insulation fabric of FIG. 3, and the example insulation fabric of FIG. 4, and associated thermographs of each of the layers illustrating the impact of the presence of an inner and/or outer layer on heat loss, according to various embodiments.

FIG. 5 illustrates the heat saving results of the outer layer and inner layer. On the left side of the picture, a base quilt 502 is depicted, which is substantially similar to the quilted inner layer of FIGS. 3 and 4 that is formed by the shell 102, 202, liner 104, 204, and the insulation material 112, 212. Base quilt 502 is comparable to the jacket depicted in FIG. 1, above. As can be seen in the accompanying thermograph 504, the base quilt 502 allows significant amounts of heat to escape, particularly through the attachment points of the quilting. Note that as depicted, base quilt 502 is quilted with a grid pattern, rather than a series of rows. It will be understood that a variety of quilting patterns may be employed, e.g. lines, columns, grids, diamonds, honeycombs, etc.

The middle picture depicts a double outer wall fabric 506, similar to the example embodiment depicted in FIG. 3, discussed above. As can be seen in the thermograph 508, the addition of the outer layer significantly reduces heat loss over the base quilt 502.

The right side picture depicts a double outer and inner wall fabric 510, similar to the example embodiment depicted in FIG. 4, discussed above. As can be seen in the thermograph 512, the addition of both an inner and outer layer further reduces heat loss over base quilt 502, as well as reducing heat loss over the double outer wall fabric 506 which lacks a double inner wall. The net result approaches the heat loss characteristics of a non-quilted jacket, with the advantages of a quilted jacket. Furthermore, as can be seen, the addition of one or two layers for a double outer wall and/or double inner wall improves the insulating properties over the base quilt for a given type and thickness of insulation material, regardless of the type of material used for the insulation material. Consequently, a jacket or garment constructed using an embodiment of either insulating fabric 100 or insulating fabric 200 will offer insulating properties comparable to a conventionally constructed jacket, e.g. base quilt only, that has a significantly thicker and bulkier layer of insulation material. The result is a jacket or garment that offers comparable warmth to the conventional jacket, but with a thinner and potentially lighter construction.

Thermal resistance of the various components of the disclosed embodiments (base quilt comprised of the shell, liner, and insulation; outer layer; inner layer, all discussed herein) were measured in general accordance with ASTM F1868, Part A—Thermal Resistance, separately and added together. These sums provide measures of thermal resistance that one might expect by simply stacking insulation layers together. The thermal resistance was then measured for the double-wall constructions. In both cases, the measured total thermal resistance was much greater than a simple linear combination of the individual components, revealing that the construction of the disclosed embodiments leads to insulation values greater than expected.

When measured for thermal resistance, as described above, the example embodiment of FIG. 3 (the middle picture of FIG. 5), fabric 100 with just outer layer 118 and no inner layer, yielded R values (a measurement of thermal resistance) as follows:

$$R_{base\ quilt} + R_{outer\ wall} = .204 \frac{°\ C\ m^2}{W}$$

$$R_{total} = .257 \frac{°\ C\ m^2}{W}$$

Likewise, the example embodiment of FIG. 4 (the rightmost picture of FIG. 5), fabric 200 with both an outer layer 218 and an inner layer 222, yielded R values as follows:

$$R_{base\ quilt} + R_{outer\ wall} + R_{inner\ wall} = .213 \frac{°\ C\ m^2}{W}$$

$$R_{total} = .286 \frac{°\ C\ m^2}{W}$$

Figure 6:
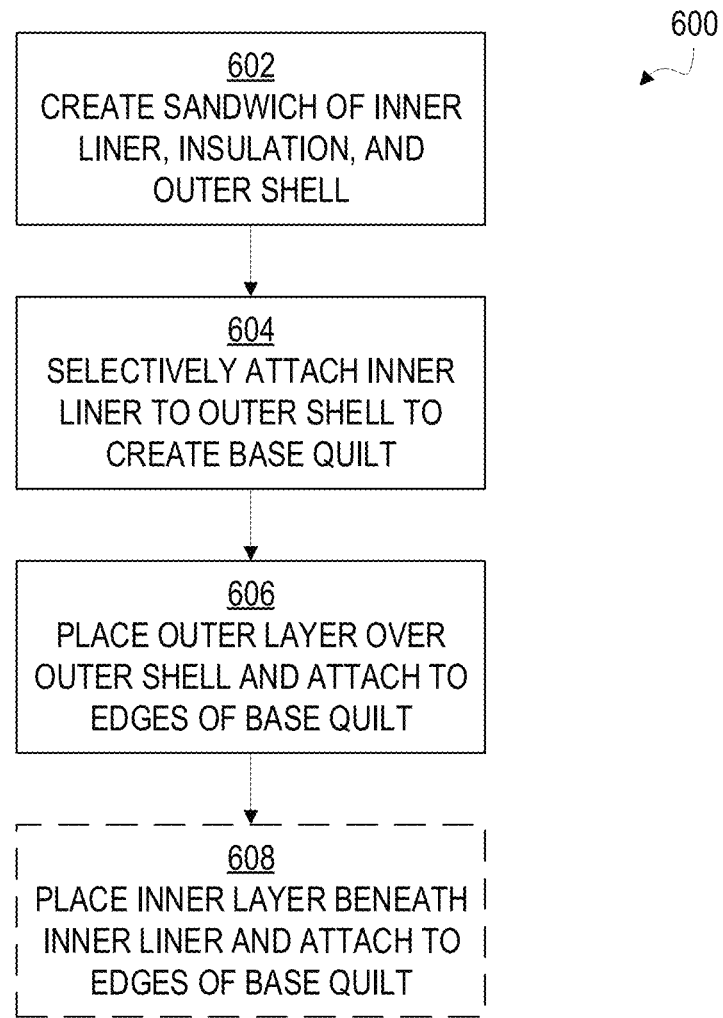
FIG. 6 is a flowchart illustrating the operations of an example method for creating an insulation fabric that includes a quilted layer, outer layer, and an inner layer, according to various embodiments.

The example embodiments may be manufactured using processes adapted from existing jacket manufacturing techniques. For example, FIG. 6 depicts the operations of an example method 600 that may be employed to create an insulating fabric with outer and inner layers that surround a base quilt, such as fabric 100 or fabric 200. The operations of method 600 may be carried out in whole or in part and, depending upon a given embodiment, one or more of the operations may be omitted or performed in a different order. Additional operations may be performed.

Beginning in operation 602, according to a possible embodiment, the base quilt may be created by first placing a sheet of liner, then disposing a sheet of insulation material atop the sheet of liner, and then disposing a sheet of shell atop the insulation material. In other embodiments, the insulation material may be omitted until after operation 604.

Next, in operation 604, the inner liner may be selectively attached to the outer shell. Where the insulation is placed between the inner liner and outer shell, the three layers may then be stitched or quilted together using sewing or stitching (such as with a sewing machine) to form the various insulation-containing pouches. This manufacturing technique results in the insulation layer being compressed at the stitch lines, but may be useful when the insulation is in a sheet or web form. Other techniques may be employed, such as sonic welding, adhesives, and/or another suitable technique for attaching the liner and shell together.

Alternatively, a layer of liner may be stitched in a quilted pattern to a layer of shell prior to insulation placement to create a series of pouches, as an alternative operation 604. Following creation of the pouches, insulation may then be inserted into each pouch, such as by stuffing or blowing. The amount of insulation may be varied in each pouch depending upon the degree of warmth desired and specific insulation type. Such a technique may be useful when the insulation is a loose-fill material, such as down, feathers, or a synthetic blown material, and/or when it is not desirable to have sheet insulation sandwiched between the liner and shell at the stitch lines. In this latter approach, at least one side or portion of each pouch must be kept open until filled with insulation.

In either approach, the resulting base quilt is cut to shape, and the edges of each base quilt may be sealed.

Following construction of the base quilt from operations 602 and 604, the outer layer may be disposed upon the shell side of the base quilt in operation 606. In embodiments, the outer layer is only secured to the edges of the base quilt, and not to the various stitch lines, so that the stitch lines are sealed from direct exposure to ambient air and to obtain improved heat retention. In other embodiments, one or more intermediate attachment points or lines may be used, depending upon the needs of a particular embodiment. The method 600 may end after operation 606 if only a double outer layer is desired, but not a double inner layer.

Operation 608 is illustrated in a dashed line, indicating that it is not performed if only a single outer later over the base quilt is desired. If a double inner layer is desired, in operation 608 the same approach used to secure the outer layer may be employed, where the inner layer is disposed beneath the liner side of the base quilt. The inner layer may only be secured to the edges of the base quilt, similar to the outer layer, or one more intermediate attachment points/lines may be used. In some manufacturing processes, the inner and outer layers may be secured simultaneously using stitching, adhesives, or a combination of both. In still other embodiments, the outer layer and/or inner layer may be removably attached using a zipper or other fastening mechanism that allows for selective detachment. Still further, in some other embodiments, the layers may be attached through a stretch binding at the edges. In yet other embodiments, some combination of the various foregoing manufacturing processes may be employed; for example, stretch binding may be used at sleeve hems where a jacket is being constructed, with conventional stitching or sewing, or adhesives, employed along the bottom jacket hem, collar, and jacket opening.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A thermally insulated garment, comprising:
a shell;
a lining that is secured to the shell at a plurality of points to form a plurality of compartments;
a thermally insulating filling contained within each of the plurality of compartments; and
an outer layer disposed adjacent to the shell and secured only to one or more edges of the shell, and an inner layer disposed adjacent to the lining and secured only to one or more edges of the lining, wherein both the outer layer and the inner layer overlay the plurality of points and the plurality of compartments while being detached from the plurality of points and the plurality of compartments to trap air between the shell and the outer layer, and between the lining and the inner layer, respectively.

2. The thermally insulated garment of claim 1, wherein one or more of the shell or lining comprise one or more heat management features.

3. The thermally insulated garment of claim 2, wherein the one or more heat management features comprise heat reflective features disposed upon the lining.

4. The thermally insulated garment of claim 1, wherein one or more of the outer layer, shell, or lining are water resistant or waterproof.

5. The thermally insulated garment of claim 1, wherein one or more of the outer layer, shell, or lining are breathable or at least partially gas permeable.

6. A thermally insulated garment, comprising:
 a base quilt comprised of:
  a shell;
  a lining that is secured to the shell at a plurality of points to form a plurality of compartments; and
  a thermally insulating filling contained within each of the plurality of compartments;
 an outer layer disposed adjacent to the shell; and
 an inner layer disposed adjacent to the lining,
 wherein the outer layer and inner layer each overlay the plurality of points and the plurality of compartments while being detached from the plurality of points and the plurality of compartments to trap air between the shell and the outer layer and to trap air between the lining and the inner layer, wherein the outer layer and inner layer are each attached to the base quilt only at one or more edges of the base quilt.

7. The thermally insulated garment of claim 6, wherein one or more of the shell or lining comprise one or more heat management features.

8. The thermally insulated garment of claim 7, wherein the one or more heat management features comprise heat reflective features disposed upon the lining.

9. The thermally insulated garment of claim 6, wherein one or more of the outer layer, inner layer, shell, or lining are water resistant or waterproof.

10. The thermally insulated garment of claim 6, wherein one or more of the outer layer, inner layer, shell, or lining are breathable or at least partially gas permeable.

11. The thermally insulated garment of claim 6, wherein at least one of the outer layer, inner layer, shell, or lining are wind resistant.

12. A method for assembling a thermally insulated garment, comprising:
 providing an inner liner and an outer shell;
 disposing an insulation layer between the inner liner and outer shell;
 selectively attaching the inner liner to the outer shell to create a base quilt with a plurality of compartments containing the insulation layer;
 disposing an outer layer over the outer shell;
 attaching the outer layer only to one or more edges of the base quilt;
 disposing an inner layer over the inner liner; and
 attaching the inner layer only to one or more edges of the base quilt.

13. The method of claim 12, wherein disposing the insulation layer between the inner liner and outer shell comprises:
 disposing the insulation layer atop the inner liner;
 disposing the outer shell atop the insulation layer; and
 selectively attaching the inner liner to the outer shell through the insulation layer.

14. The method of claim 12, wherein disposing the insulation layer between the inner liner and outer shell comprises inserting the insulation layer into each of the plurality of compartments after the inner liner is selectively attached to the outer shell.

15. The method of claim 12, wherein selectively attaching the inner liner to the outer shell comprises stitching the inner liner to the outer shell through the insulation layer.

* * * * *